United States Patent [19]
Chao

[11] Patent Number: 6,057,668
[45] Date of Patent: May 2, 2000

[54] BATTERY CHARGING DEVICE FOR MOBILE PHONE

[75] Inventor: Wen-Chung Chao, Taipei, Taiwan

[73] Assignee: Shi-Ming Chen, Tainan, Taiwan

[21] Appl. No.: 09/164,913

[22] Filed: Oct. 1, 1998

[51] Int. Cl.[7] ................................................ H01M 10/46
[52] U.S. Cl. ........................................................ 320/108
[58] Field of Search .................................... 320/107, 108, 320/DIG. 19; 336/DIG. 2

[56] References Cited

U.S. PATENT DOCUMENTS

| | | | |
|---|---|---|---|
| 4,496,896 | 1/1985 | Melocik et al. | 320/108 |
| 4,654,573 | 3/1987 | Rough et al. | 320/108 |
| 5,654,621 | 8/1997 | Seelig | 320/108 |
| 5,656,923 | 8/1997 | Schultz et al. | 320/108 X |
| 5,889,384 | 3/1999 | Hayes et al. | 320/108 |

*Primary Examiner*—Edward H. Tso
*Attorney, Agent, or Firm*—W. Wayne Liauh

[57] ABSTRACT

Disclosed is a charging device for mobile phone wherein the battery can be charged by a secondary coil with current induced from a primary coil in a charging stage. The inventive charging device use magnetic induction, rather than metal contact, to transfer electrical energy to battery, therefore, the poor-contact problem in prior art can be prevented and the alignment tolerance between battery and charging device can be enhanced.

5 Claims, 3 Drawing Sheets

BATTERY CHARGING DEVICE FOR MOBILE PHONE

FIELD OF THE INVENTION

The present invention relates to a charging device for use with mobile phones, more particularly, to a contact-free type charging device for use with mobile phones, which delivers electrical energy to the mobile phone through magnetic induction.

BACKGROUND

The use of mobile phones has become more and more popular recently for the provision of fast and convenient communication. The power source of the mobile phone generally comes from a rechargeable battery, therefore charging efficiency and the durability of the battery are important issues. The conventional charging device generally conveys electrical power to the battery of the mobile phone through metal contact thereof and the mating metal contact of the battery to be charged. More particularly, the metal contacts are generally formed to have specific number and shape to delivers electrical energy efficiently between the battery and charging device.

However, the metal contact of the charging device and the mating metal contact may have poor contact therebetween if the battery is not precisely aligned with the charging device. The charging efficiency is degraded and the charging time is prolonged due to the poor contact between those metal contacts.

The transmission of electrical energy by coil induction has been adopted in the application of electric tooth-brush. More particularly, the tooth-brush contains a barrel-shaped iron core to receive electrical energy induced from a cylindrical iron core energized by a power source. However, the alignment tolerance of above-mentioned induction-type energy transmission method is not sufficient for the application of mobile phone.

It is an object of the present invention to provide a charging device for mobile phone which uses coil induction to convey electrical energy, thus increasing the alignment tolerance between battery and charging device, and enhancing the charging efficiency.

To achieve the above objects, the present invention provides a charging device which has an induced-type power supply device and a charging stage. The induced-type power supply device comprises an induced iron core, a secondary coil around the surface of the iron core, an induced-type power transmission device and a sensor connected to the iron core. The charging stage comprises a primary iron core of ringer-shape, a primary coil around the surface of the primary iron core, a power source and a controller connected to the coil. When the battery of the mobile phone is to be charged, the power supply generates an intense magnetic field through sending current to the primary coil around the primary iron core. The generated magnetic field induces electric current on the secondary coil around the induced iron core, which can charge the battery through the induced-type power transmission device and the sensor.

The above-mentioned sensor is functioned to detect the charging state of the battery, such as the charging voltage, the charging current and the remaining charge. The sensor will send a warning signal to the controller to reduce or turn off charging voltage in case that the charging voltage or charging current is excessive. Moreover, the sensor detects the remaining charge of the battery and sends indication signal to the controller for displaying for user.

The induced-type power transmission device is commonly used in conventional charger and has constant-voltage/limiting current or constant current/limiting voltage function.

Moreover, the inventive charging device can be applied to those rechargeable battery such as nickel-cadmium (Ni—Cd), Ni-MH or lithium ion battery.

The various objects and advantages of the present invention will be more readily understood from the following detailed description when read in conjunction with the appended drawings, in which:

DETAILED DESCRIPTION OF THE PREFERRED EMBODIMENT

The present invention is intended to provide a charging device which conveys electrical power to the buttery of mobile phone by the induced magnetic field rather than by the physical connection with metal contacts such that the problem of poor contact in prior art is prevented and the charging efficiency is enhanced.

Figure 1:
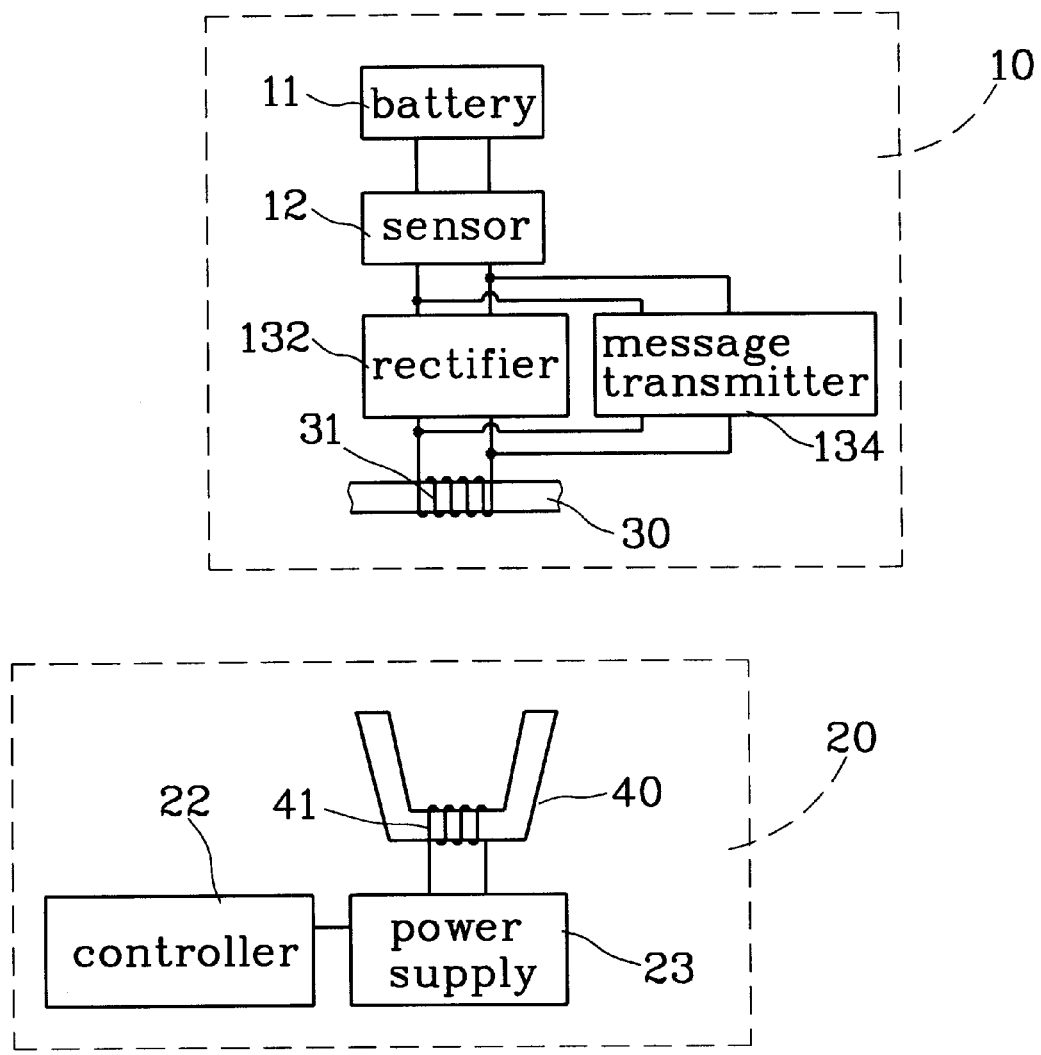
FIG. 1 is the block diagram of the preferred embodiment according to the present invention.

FIG. 1 shows the block diagram of the preferred embodiment. The inventive charging device comprises an induced-type power supply 10 and a charging stage 20. The induced-type power supply 10 is generally arranged within the handset of the mobile phone. The other component of mobile phone, such as communication circuit and display circuit, are not related to the inventive charging device, therefore the description thereof is omitted for clarity.

As shown in FIG. 1, the induced-type power supply 10 is provided with an induced iron core 30 for receiving the induced magnetic flux and secondary coil 31 around the iron core 30 to conduct the induced current.

The output of the secondary coil 31 is connected to a rectifying device 132. The type of the rectifying device can be full-wave type or half-wave type, depending on the battery used.

The battery used can be, for example, Ni—Cd/Ni MH or lithium ion type. Moreover, a sensor 12 is connected between the output of the rectifying device 132 and the battery 11 to be charged. The sensor 12 is used to detect the charging condition of the battery 11, such as charging voltage, charging current, or the remaining charge of the battery.

Figure 2:
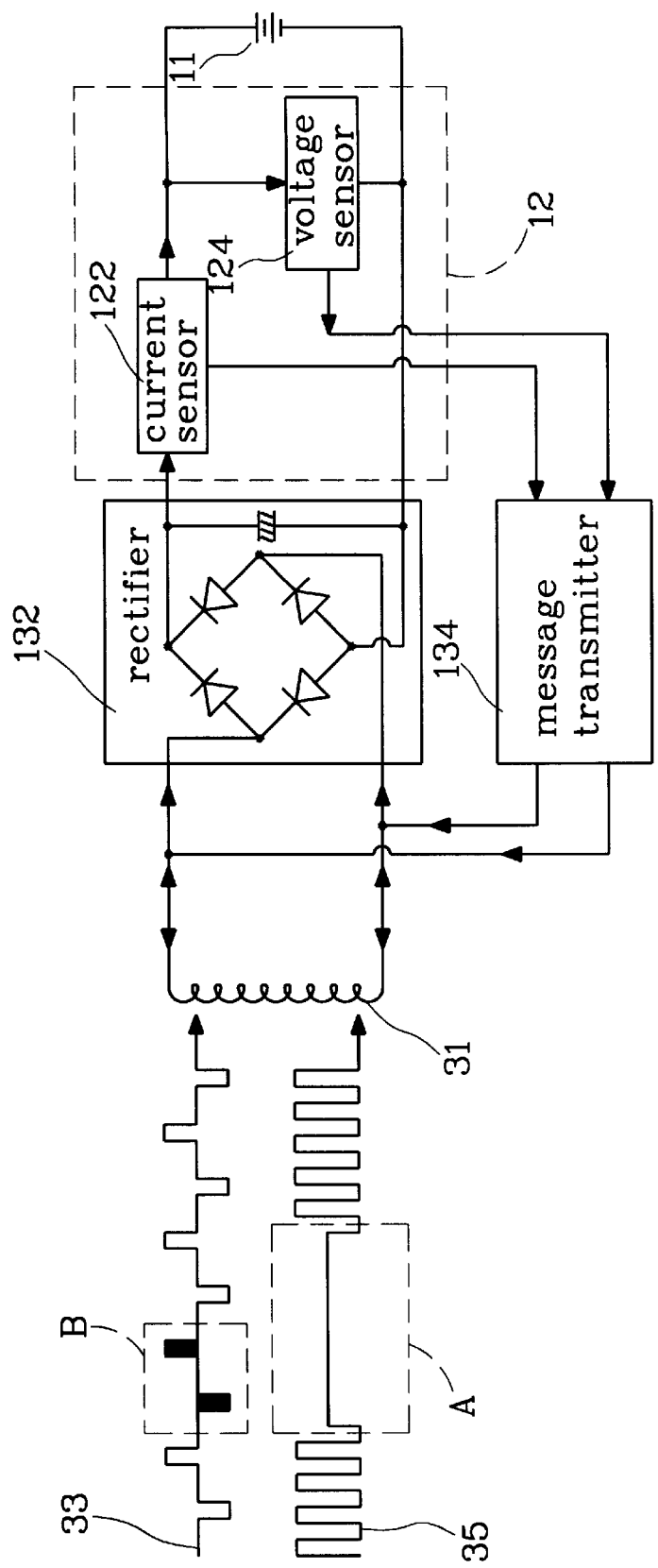
FIG. 2 is the detailed circuit of the block diagram in FIG. 1.

With reference now to FIG. 2 the circuit related to the sensor 12 and the processing of signal thereof is described in more detail. As shown in FIG. 2, the inventive charging device further comprises an information transmitter 134 arranged between the sensor 12 and the secondary coil 31 and for sending the detecting result of the sensor 12 to the charging stage 20.

The information transmitter 134 can send the information, for example, by short-circuit type signal 33, or intermittent-type signal 35, as shown in FIG. 2. More particularly, the short-circuit type signal 33 is formed by short-circuiting the periodic signal sent from the charging stage 20 to the induced-type power supply 10 for a certain duration. The controller 22 in the charging stage 10 uses the duration information sent by the information transmitter 134 to control the amount of magnetic flux. As shown in FIG. 2, the section of signal B marked by the dashed box denotes the short-circuit type signal 33.

The intermittent-type signal 35 is formed by interrupting the periodic signal sent from the charging stage 20 to the induced-type power supply 10 for a period of time per several periods. The controller 22 uses the interrupted period sent from the information transmitter 134 to control the amount of magnetic flux, thus controlling the charging amount. As shown in FIG. 2, the section of signal A marked by the lower dashed box represents the intermittent-type signal 35.

The sensor 12 further comprises a current sensor 122 in series connection with the rectifying device 132 and the battery 11 to detect the charging current, and a voltage sensor 124 in parallel connection with the battery 11 to detect the charging voltage. Moreover, the voltage sensor 124 can also be functioned to detect the charge amount of the battery 11 and send indication to the charging stage 20 for controlling amount of charging. For example, the voltage sensor 124 may comprises a voltage divider to detect the charging voltage.

Moreover, the charging stage 20 comprises a primary iron core 40, primary coil 41 around the iron core 40, a power supply 23 connected to the primary coil 41, and a controller 22 connected to the power supply 23. The power supply is functioned to provide electrical energy to the charging device by supplying a magnetic flux over the primary iron care 40 with coil 41. The magnetic flux on the primary iron core 40 will induce current on the secondary coil 31 around the induced iron core 30, thus charging the battery 11.

Moreover, the controller 22 in the charging stage 20 controls the power supply 23 according to the detection result sensed by the sensor 12 and sent through the information transmitter 134. For example, the controller will command the power supply to reduce or even stop providing the charging voltage/charging current in case that the charging voltage/current is harmfully high, thus prolonging the lifetime of battery.

Figure 3:
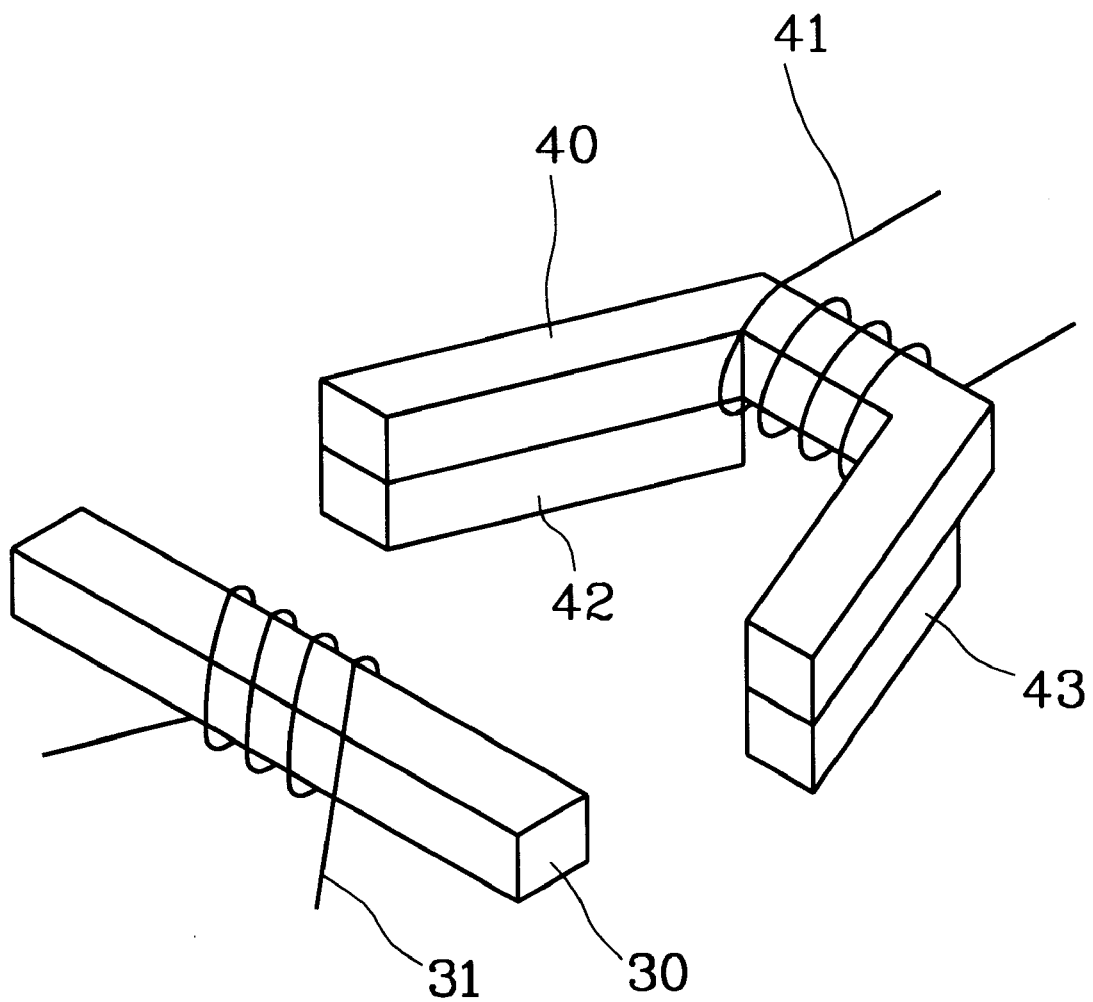
FIG. 3 is a perspective view showing the primary iron core and the induced iron core in the preferred embodiment.

The inventive charging device is characterized in the shapes and arrangements of the primary iron core 40 and the secondary iron core. The primary iron core 40 is of ringer-shape with gap toward the secondary iron core 30, as shown in FIG. 3. Moreover, the primary iron core 40 can be of semi-circle shape. As also shown in FIG. 2, both the arms of the primary iron core 40 are two-layer iron core 42, 43 with gap formed therebetween and toward the secondary iron core 30. The primary coil 41 around the primary iron core 40 is functioned to convert the electrical energy of power source to magnetic energy; and the secondary coil 31 around the secondary iron core 40 is functioned to convert the magnetic energy induced from the primary iron core 40 to electrical energy charging the battery. Moreover, the shape and arrangement of the primary iron core 40 are such that the magnetic flux thereof has efficient coupling to the secondary iron core, thus increasing the alignment tolerance of the charging device.

Although the present invention has been described with reference to the two preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A charging device for charging the battery of a mobile phone, comprising a charging stage having a primary iron core, a primary coil around said primary iron core and functioned to convert electrical energy into magnetic energy, a power supply connected to said primary coil for providing the electrical energy for charging, and a controller connected to said power supply to control the amount of electrical power provided by said power supply;

an induced-type power supply having a secondary iron core, a secondary coil around said secondary iron core and functioned to convert said magnetic energy linked from said primary iron core to electrical energy for charging the battery to be charged, a rectifying device connected to the output of said secondary coil to function as power supply to battery, a sensor connected to the output of said rectifying device to detect a charging state of said battery;

an information transmitter functioned to transmit said charging state detected by said sensor to said controller through said secondary iron core, whereby said controller can control the electrical energy provided by said power supply;

wherein said sensor comprises a current sensor in serial connection with said rectifying device and said battery, and a voltage sensor in parallel connection with said battery, and said information transmitter generates a short-circuit signal by short-circuiting the periodic signal sent from the said charging stage for a certain duration, thus indicating the charging state to said charging stage.

2. The charging device for charging the battery of mobile phone as in claim 1, wherein said primary iron core is of ringer-shape or semi-circular shape with an outer opening.

3. The charging device for charging the battery of mobile phone as in claim 1, wherein said voltage sensor is a voltage-divider to sense the charging voltage of said battery.

4. The charging device for charging the battery of mobile phone as in claim 1, wherein said current sensor is a current meter to sense the charging current of said battery.

5. A charging device for charging the battery of a mobile phone, comprising a charging stage having a primary iron core, a primary coil around said primary iron core and functioned to convert electrical energy into magnetic energy, a power supply connected to said primary coil for providing the electrical energy for charging, and a controller connected to said power supply to control the amount of electrical power provided by said power supply;

an induced-type power supply having a secondary iron core, a secondary coil around said secondary iron core and functioned to convert said magnetic energy linked from said primary iron core to electrical energy for charging the battery to be charged, a rectifying device connected to the output of said secondary coil to function as power supply to battery, a sensor connected to the output of said rectifying device to detect a charging state of said battery;

an information transmitter functioned to transmit said charging state detected by said sensor to said controller through said secondary iron core, whereby said controller can control the electrical energy provided by said power supply;

wherein said sensor comprises a current sensor in serial connection with said rectifying device and said battery;

further wherein said information transmitter generates a intermittent-type signal formed by interrupting the periodic signal sent from said charging stage, thus indicating the charging state to said charging stage.

* * * * *